US005097344A

United States Patent [19]

Aoki et al.

[11] Patent Number: 5,097,344

[45] Date of Patent: Mar. 17, 1992

[54] APPARATUS FOR RECORDING AND PLAYING BACK STILL VIDEO IMAGES

[75] Inventors: Harumi Aoki; Kouichi Sato, both of Tokyo, Japan

[73] Assignee: Asahi Kogaku Kogyo Kabushiki Kaisha, Tokyo, Japan

[21] Appl. No.: 416,948

[22] Filed: Oct. 4, 1989

[30] Foreign Application Priority Data

Oct. 4, 1988 [JP] Japan ............................... 63-250265

[51] Int. Cl.[5] ............................................. H04N 5/76

[52] U.S. Cl. .................................... 358/310; 358/335; 358/909; 360/9.1

[58] Field of Search ............... 358/341, 343, 310, 335, 358/906, 909, 84, 86, 185; 360/19.1

[56] References Cited

U.S. PATENT DOCUMENTS 4,065,794 12/1977 Shutterly .
4,344,082 8/1982 Ishiodori .
4,531,161 7/1985 Murakoshi .
4,555,735 11/1985 Usuki et al. ........................ 358/330
4,746,990 5/1988 Katoh et al. .
4,746,993 5/1988 Tada ................................ 358/335
4,777,503 10/1988 Kramer .

FOREIGN PATENT DOCUMENTS 3026966 2/1981 Fed. Rep. of Germany .
2591838 6/1987 France .
WO86/00771 1/1986 PCT Int'l Appl. .
WO87/01852 3/1987 PCT Int'l Appl. .

OTHER PUBLICATIONS

German Office Action.
Ein Stecker Schafft Alle Verbindungen, Funkschau pp. 50–51, vol. 18, 1982.

*Primary Examiner*—Robert L. Richardson
*Attorney, Agent, or Firm*—Sandler, Greenblum & Bernstein

[57] ABSTRACT

A still video apparatus having a play back function of a picture signal and a sound signal recorded onto a recording medium, wherein a demodulated brightness signal and a color difference signal, a composite signal thereof, a demodulated sound signal and a sound output signal having an extended time base are selectively supplied to an external device by a single connector.

22 Claims, 4 Drawing Sheets

56 54 sound output signal 25 sound play-back circuit 26 demodulated sound signal Y+S LSC tracking control circuit 30 31 32 34 35 composite output 41 picture forming circuit picture recording and playing-back circuit 36 40 42 37 38 43 45 33 system control circuit 39 44 47 15 46 49 L C D panel 48 51 50 53 52 16 18 17a 17b 17 21 22 SWP SWP 20 19 23a 23b 23

26b
26c
26a
26
25a
25
composite output signal

LSC
55
sound output signal
Y+S
35
64
picture processing circuit
62
switching circuit
65
sound signal extension circuit
54
63
sound signal processing circuit
signal judging circuit
61
35

APPARATUS FOR RECORDING AND PLAYING BACK STILL VIDEO IMAGES

BACKGROUND OF THE INVENTION

1. Field of the Invention

The present invention relates to a still video apparatus, and more precisely, it relates to a still video apparatus in which various signals, such as pictures signals and sound signals can be selectively outputted by a single output connector.

2. Description of Related Art

Still video cameras are known having a sound recording function, in which pictures and sound can be monitored, played-back and copied.

However, in such a still video camera, it is necessary to provide separate output terminals for picture signals, sound signals and copying signals. This results in a need for an increased space in which these terminals are provided. Furthermore, it is necessary to provide at least two connecting conductors (cords), or to exchange a connecting cord for another connecting cord in order to monitor or copy the signal.

In addition to the foregoing, there is no known still video camera having an AV terminal which can output both the sound signals and picture signals simultaneously. That is, in the known still video camera, no copying output signal including sound signals are generated.

The primary object of the present invention is to eliminate the drawbacks mentioned above by providing a still video apparatus in which various signals, including sound and picture signals can be transmitted to an external device by a single terminal.

SUMMARY OF THE INVENTION

To achieve the object mentioned above, according to the present invention, there is provided a still video apparatus comprising means for recording a picture signal onto a recording medium and for play-back the recorded picture signal, a single connecting means for connecting the recording and play-back means to an external device, and output switching means for selectively connecting a plurality of signals which are issued by the recording and play-back means to an output terminal of the connecting means, by an external operation.

With this arrangement, since the still video apparatus can be connected to the external device by the single connecting means the space necessary for providing connecting means can be made smaller and the number of connecting cords can be decreased. Namely, in the present invention, only a single connecting cord is necessary.

BRIEF DESCRIPTION OF THE DRAWINGS

The invention will be described below in detail with reference to the accompanying drawings in which.

DESCRIPTION OF PREFERRED EMBODIMENTS

Figure 3:
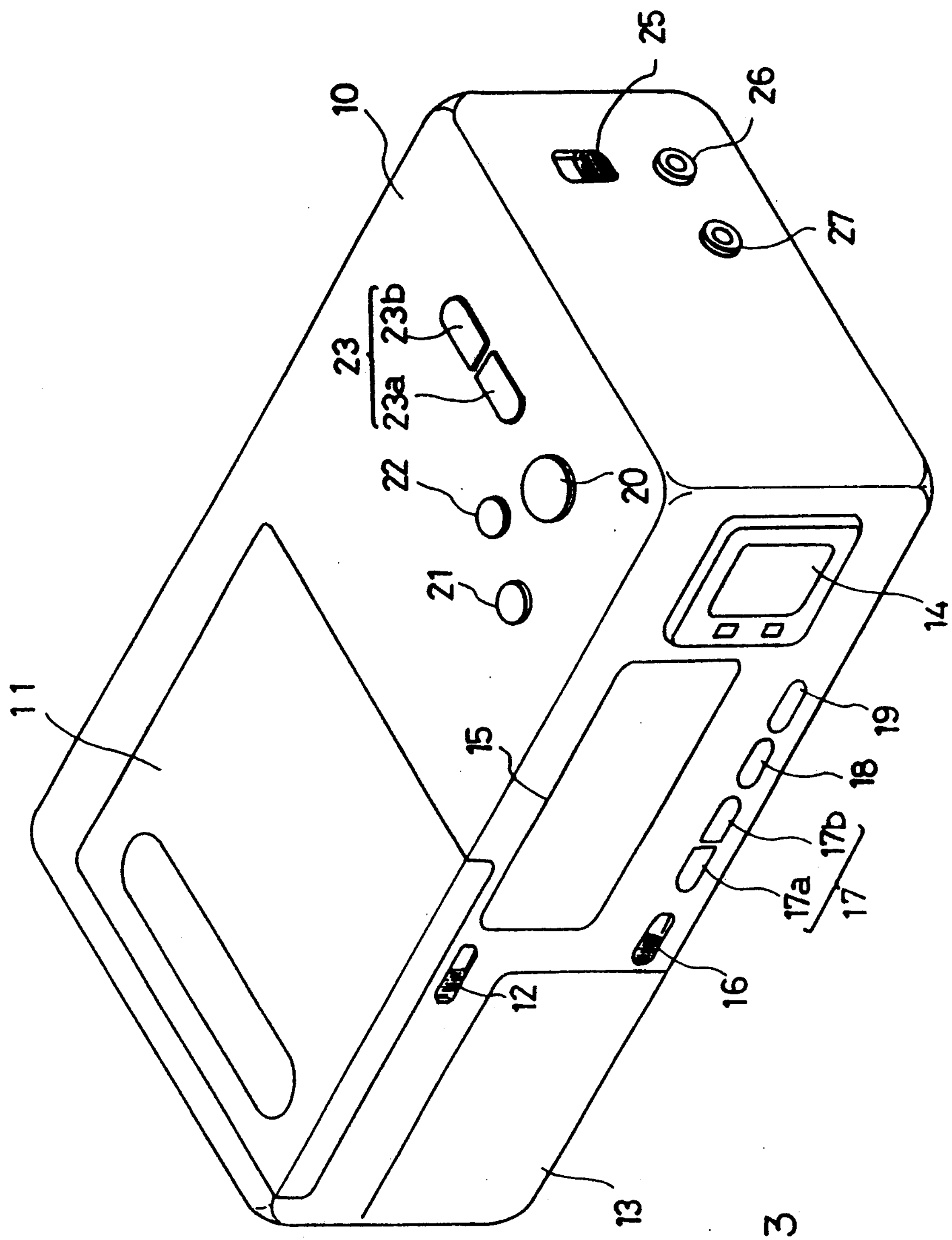
FIG. 3 is a perspective view of a still video camera shown in FIG. 1, viewed from behind; and, FIG. 4 is a diagram of picture recording and playing-back circuit and sound playing-back circuit.

FIG. 3 shows the appearance of a still video camera to which the present invention is applied. In FIG. 3, the still video camera has a parallel-piped camera body 10 which is provided on its upper face, with a cover 11 which is opened when a magnetic disk is loaded. The cover 11 has, as is well known, a disk holder (not shown) provided on its inner side face, so that the magnetic disk held by the disk holder can be located in an operative position when the cover 11 is closed. The cover 11 is continuously biased by a spring member (not shown) to be opened and is normally locked at a closed position by a locking mechanism (not shown) which can be unlocked by an ejector button 12.

On the left end of the front face of the camera body 10, as viewed from the front, is a battery cover 13 which is opened to load a battery or batteries. A finder eye piece portion 14 is provided on the right end of the front face of the camera body 10.

An LCD panel 15 is provided on the front face of the camera body between the the battery cover 13 and the eye piece portion 14. The LCD panel 15 has a large number of segments for indicating the number of recorded tracks of the recording medium, photographing modes, recording and play-back modes, and calender information, such as the date and time at the present time, etc.

Below the LCD panel 15 are provided various switches, including a power switch 16, an up-down switch 17 comprising an up-switch 17*a* and a down-switch 17*b*, a mode switch 18 and a select switch 19 which are arranged in this order from left to right, as viewed from the front. The power swich 16 is slidable between an operative position and an inoperative position. The up-down switch 17, mode switch 18 and select switch 19 are pushed down to bring them into respective operative positions.

A release button 20 is provided on the right end of the upper face of the camera body 10. In the vicinity of the release button 20 are a strobe switch 21, an exposure correcting switch 22 and a zoom switch 23, comprising a TELE switch 23*a* and a WIDE switch 23*b*.

The release button 20 is actually a two-step push button, in which, when it is pushed down halfway (to a first step), a play switch SWP (FIG. 2) is turned ON, and when it is fully depressed (to a second step), a release switch SWR (FIG. 2) is turned ON. The strobe switch 20, exposure correcting switch 22 and zoom switch 23 are all normally open type push button switches.

On the side face of the camera body 10 is a monitor/copy changing switch 25 which functions as a switching means, an AV output connector 26 which functions as a connecting means and a DC input receptacle 27. The monitor/copy changing switch 25 is a slide switch to switch the picture and sound signals to be outputted from the AV output connector 26 for copying picture and sound singals or to output a composite picture signal and sound output signal (monitor signal), respectively. The AV output connector 26 has a pair of signal output terminals 26*a* and 26*b* and one ground terminal 26*c* (FIG. 1).

On the front face of the camera body 10 are provided a photographic lens, strobe, finder, light emitting and receiving window for measuring an object distance and other elements necessary for a camera, which are not shown and not explained herein, since the subject of the present invention is not directly related to these functions.

Figure 1:
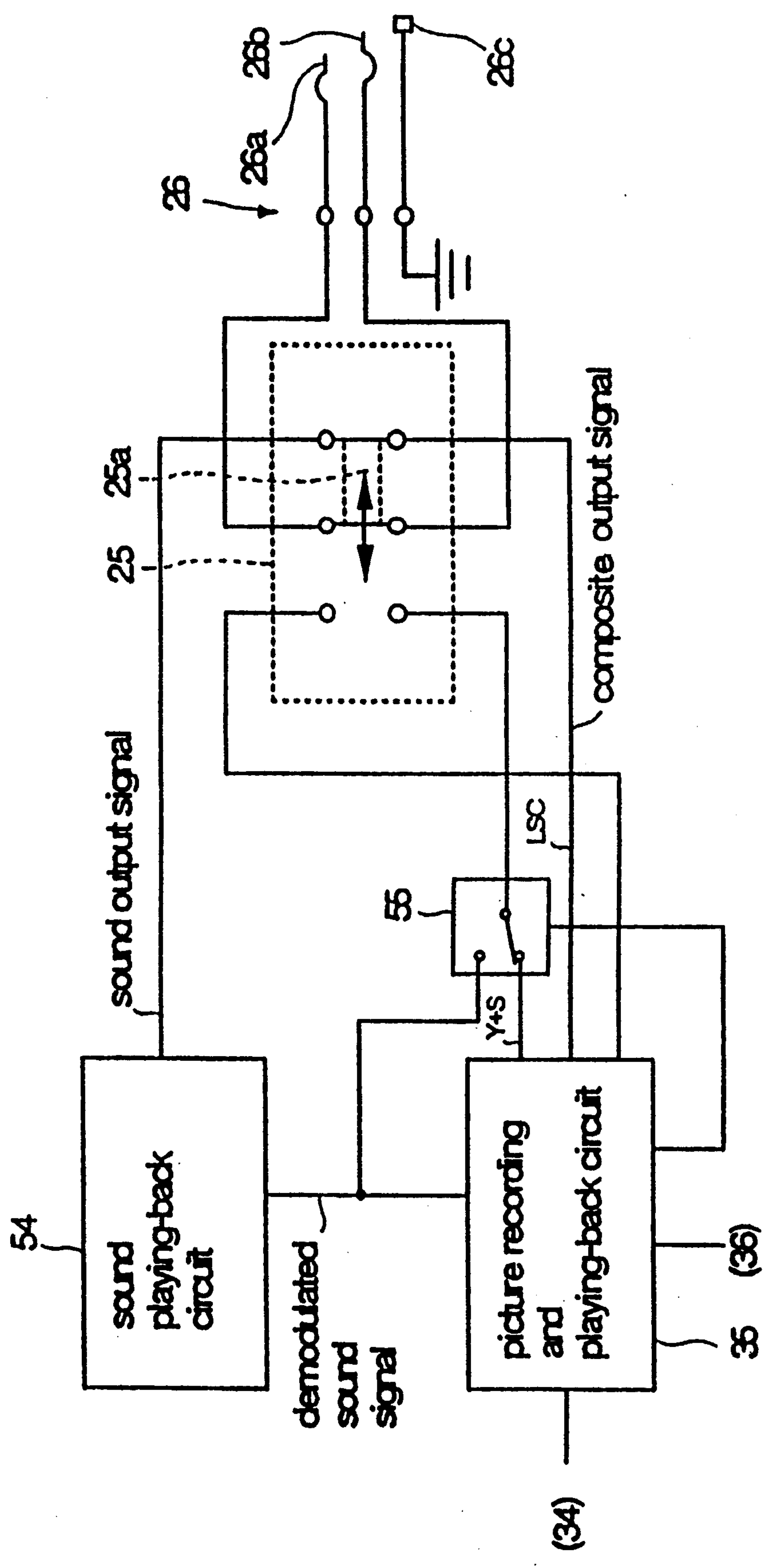
FIG. 1 is a block diagram showing a control circuit of a still video camera according to an aspect of the present invention.
Figure 2:
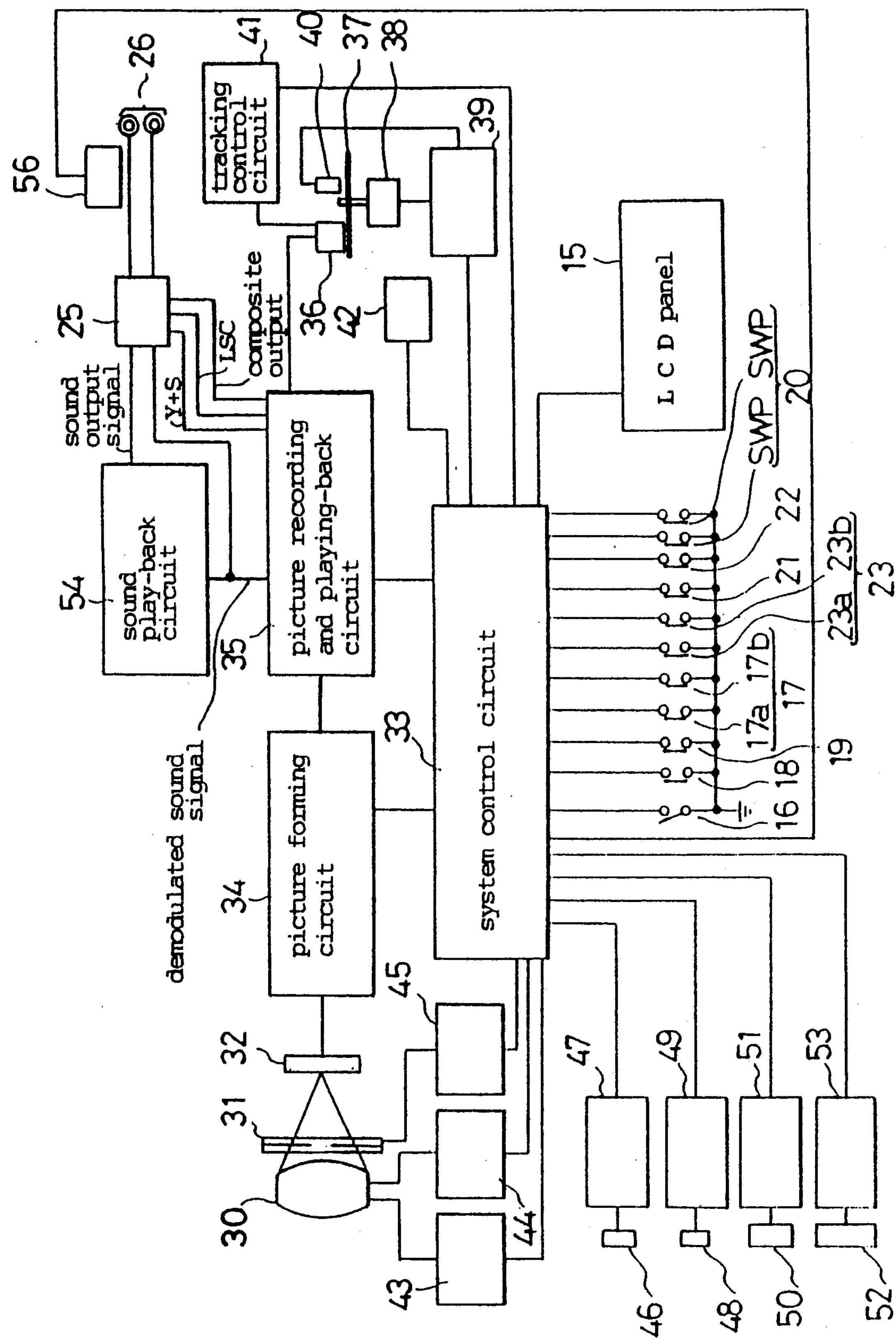
FIG. 2 is a block diagram showing a control system of a still video camera shown in FIG. 1.

The following discussion will be directed to an optical system and a control system of a still video camera according to the present invention, with reference to FIGS. 1 and 2. A diaphragm 31 is provided in the rear of a zoom lens 30 and a CCD image sensor 32 is provided in the rear of the diaphragm 31. An image of an object formed by the zoom lens 30 is focused onto a light receiving surface portion of the CCD image sensor 32 through the diaphragm 31.

The integration of data of the CCD image sensor 32 (accumulation of signal charges) and the transfer of the signal charges are controlled by a system control circuit 33, through a picture forming circuit 34.

The electrical charges accumulated by the CCD image sensor 32 are supplied to the picture forming circuit 34 and then therefrom to a picture recording and play-back circuit 35 which constitute a recording and play-back means, as a picture signal. The picture signals are processed to be a brightness signal (Y+S), color difference signal LSC(B−Y, R−Y) and data signal by the picture recording and play-back circuit 35. After that, the signals are FM-modulated and recorded onto predetermined tracks of a magnetic disk 37 as a recording medium through a magnetic head 36, which constitutes the recording and play-back means.

The magnetic disk 37 is driven to be rotated by a spindle motor 38, which is in turn controlled by the system control circuit 33 through a spindle motor drive circuit 39. Pulses generated by a PG coil 40, as the magneteic disk 37 is rotated, are fed back to the spindle motor drive circuit 39. Thus the spindle motor drive circuit which is 39 functions as a servo circuit adapted to control a phase of the motor on the basis of a PG signal coming from the PG coil 40 and to control the r.p.m. of the motor on the basis of a FG signal coming from the spindle motor 38.

The magnetic head 36 is moved to a predetermined track of the magnetic disk 37 by a tracking control circuit 41 to record and play-back the signals. As is well known, there two types of recording systems: i.e. a field record and a frame record. The magnetic head 36 is moved for every track by the operation of the up-down switch 17.

A loading swich 42 detects that the magnetic disk 37 is loaded and outputs a detection signal to the system control circuit 33.

The zoom lens 30 has a group of magnification varying lenses which are moved by the zoom motor 43 and a group of focusing lenses which are moved by an AF (automatic focus) drive circuit 44. The diaphragm 31 is opened and closed by a diaphragm drive circuit 45. The zoom motor 43, the AF drive circuit 44 and the diaphragm drive circuit 45 are driven and controlled by the system control circuit 33.

The still video camera of the present invention has a number of sensors including a photometer sensor 46, a color temperature sensor 48 and an AF sensor 50.

The brightness signal (analogue signal) of an object outputted from the photometer sensor 46 is logarithmically compressed and converted to a digital signal to be supplied to the system control circuit 33. The system control circuit 33 performs an arithmetic operation in accordance with the signal outputted from the system control circuit 33 to set a diaphragm value of the diaphragm 31 and the integration time of the CCD image sensor 32.

The color temperature signal (blue(B) and red(R)) outputted from the color temperature sensor 48 is logarithmically converted by a color temperature detecting circuit 49 to be outputted to the system control circuit 33 in which the blue and red color temperature signals are compared with each other to effect a white balance adjustment.

The AF sensor 50 is a triangulation measuring system type of sensor, having a light receiver and a light emitter for detecting an object distance. The object distance signal issued by the object distance measuring sensor 50 is supplied to the system control circuit 33 through an AF detecting circuit 51. The system control circuit 33 performs an arithemtic operation to obtain a displacement of the focusing lens group in accordance with the detection signal, so that the focusing lens group can be moved to a focused position through the AF motor 44 in accordance with the displacement thus detected.

The still video camera of the present inventin has a strobe device incorporated therein, having a strobe light emitting portion 52 and a strobe control circuit 53. The control of the strobe light emitting portion 52 is effected by the system control circuit 33 through the strobe control circuit 53. In the illustrated embodiment, the camera has an auto mode in which light is automatically emitted when the brightness of an object is below a predetermined value; a compulsory light emitting mode in which light is compulsively emitted regardless of the brightness; and, a light emission prohibiting mode in which no light is emitted. These three modes are switched by the strobe switch 21.

Although the still video camera according to the present invention can also record and play-back sound in addition to a picture, a play-back circuit for sound is only illustrated. The sound is recorded on one track of the magnetic disk 37 for one track of the picture. Since the recording of sound is well known and is not a subject of the present invention, no explanation therefor is given herein.

The picture recording and play-back circuit 35 is connected to a sound play-back circuit 54, so that when the signal read by the magnetic head 36 upon play-back is a sound signal, it is outputted to the sound play-back circuit 54. The picture signal and the sound signal can be discriminated from each other, for example by detecting the presense of a vertical synchronous signal which is recorded on the magnetic disk 37 together with the picture signal.

The sound play-back circuit 54 comprises an A/D convertor, RAM, and a D/A convertor. Upon play-back, the sound signal from the picture recording and playing-back circuit 35 is converted to a digital signal to be stored, temporally extended, and converted again to an analogue signal to be outputted as an sound output signal.

The picture recording and play-back circuit 35 and the sound play-back cirrcuit 54 are connected to the AV output connector 26 through the monitor/copy switching circuit 25.

The system control circuit 33 comprises a micro computer having a CPU, ROM, and RAM, etc. to generally control the whole operation of the still video camera.

The basic operation of the still video camera according to the present invention is as follows. When the magnetic disk 37 is loaded, a loading detection switch 42 is turned ON, which is detected by the system control circuit 33. In this state, when the power switch 16 is turned ON, the spindle motor 38 begins rotating to rotate the magnetic disk 37 at a predetermined number of revolution. As a result, the magnetic head 36 is positioned onto a first track (outer most track) to check whether or not the track is a recorded track. The checking is effected by the system control circuit 33, which judges whether the magnetic head 36 takes the signal from the track on which the signal is recorded. In this case, the magnetic head 36 functions as a play-back head.

If the track above which the magnetic head 36 is brought is a non-recorded track, the magnetic head 36 is stopped there. On the contrary, if the track is a recorded track, the magnetic head 36 is moved to the next track (i.e., track two from track one) to check whether the track is a recorded track. Thus, the magnetic head 36 is stopped above the first non-recorded track. Namely, the magnetic head 36 is brought to an initial position in which a signal can be recorded onto the magnetic disk 37 by the magnetic head 36. The number of the track at which the magnetic head 36 stops is indicated on a photographic track number indicating section of the LCD panel 15.

When the release button 20 is depressed half-way to turn the play switch SWP ON, a photometer circuit 47, the AF detection circuit 51 and the color temperature detecting circuit 37 are activated, so that the arithmetic operations for detecting the object brightness, the object distance and the white balance correcting value can be performed by the system control circuit 33 in accordance with the output of the circuits mentioned above.

After that, the diaphragm 31 is opened to be a predetermined diaphragm value by the diaphragm drive circuit 45 in accordance with the results of the arithmetic operations, so that the focusing lens group of the zoom lens 30 is moved to a focused position by the AF drive circuit 44 to determine the white balance correcting value of the picture taking circuit 34. When the brightness is below a predetermined value, namely, when the object is too dark to be photographed, the strobe control circuit 53 operates to commence the charging of a strobe capacitor.

When the release 20 is fully depressed to turn the release switch SWR ON, the integration of the CCD image sensor 32 will start and then be stopped in the lapse of a predetermined time. The picture signal outputted by the CCD image sensor 32 is subjected to the necessary processes, such as FM modulation by the picture taking circuit 34 and the picture recording and play-back circuit 35 to be recorded on a predetermined track of the magnetic disk 37 by the magnetic head 36.

Upon completion of a recording, the magnetic head 36 is moved toward a subsequent track, so that the track number is incremented by one on the photographic track number indicating section of the LCD panel 15.

As mentioned before, the sound signal is recorded on one predetermined track of the magnetic disk for each picture signal (each track for one picture signal). Note however that the sound signal is recorded on four divided sectors of one track which are spaced from one another.

The following discussion will be directed to a switching mechanism of the output signals (see FIG. 1). The output terminal of the brightness signal Y+S and the output terminal of the sound signal, of the picture recording and play-back circuit 35 are connected to independent input terminals of a sound/picture signal switching circuit 55. The sound/picture signal switching circuit 55 has one output terminal to which the input terminals thereof are selectively connected. The connection between the input terminals and the output terminal of the sound/picture signal switching circuit 55 is controlled by the picture recording and play-back circuit 35. The output terminal of the sound/picture signal switching circuit 55 is connected to one of a pair of copying terminals of the monitor/copy changing switch 25. The other copying terminal of the monitor/-copy changing switch 25 is connected to the picture recording and play-back circuit 35, through the output line of the color difference signal LSC thereof.

A pair of input terminals of the monitor/copy changing switch 25 are connected to the sound output singal terminal of the sound play-back circuit 54 and the composite output signal terminal of the picture recording and play-back circuit 35, respectively. A pair of output terminals of the monitor/copy changing switch 25 are connected to independent terminals of the AV output connector 26. Accordingly, when a slider 25*a* of the monitor/copy changing switch 25 is switched to the copy side, the connection between the AV output connector 26 and the demodulated sound signal output terminal of the picture recording and playing-back circuit 35, or between the AV output connector 26 and the output terminals of the brightness signal Y+S and color difference signal LSC of the picture recording and playing-back circuit 35 is selectively established by the switching operation of the sound/picture signal switching circuit 55. On the other hand, when the slider 25*a* of the monitor/copy changing switch 25 is switched to the monitor side, the output terminal of the sound output signal of the sound play-back circuit 54 and the output terminal of the composite output signal of the picture recording and play-back circuit 35 are connected to the AV output connector 26.

Figure 4:
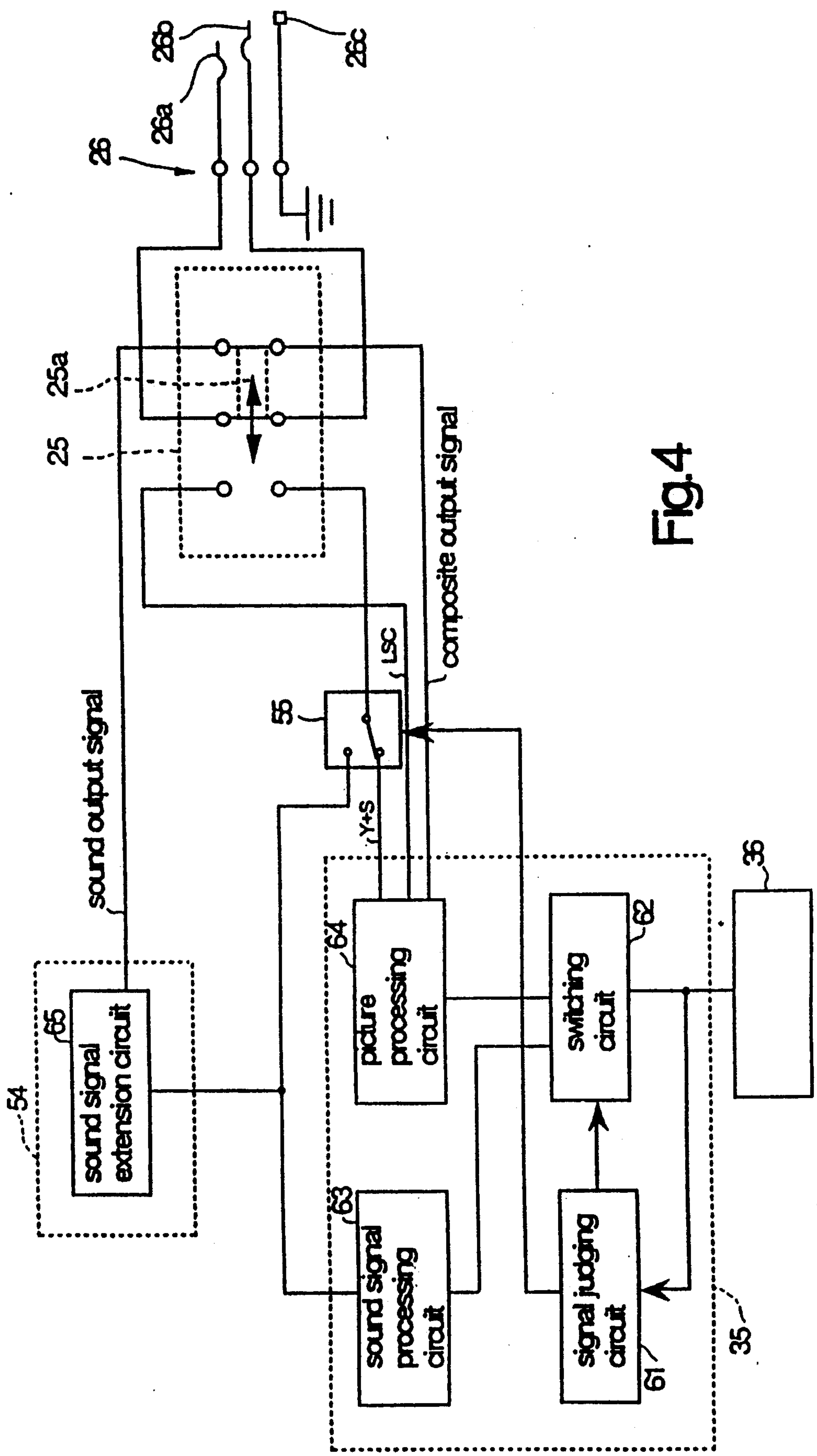

The switching operation will be described below in more detail with reference to FIG. 4, which shows more clearly the picture recording and play-back circuit 35 and the sound play-back circuit 54.

When an inputting AV connector of a monitor TV or the like is connected to the AV output connector 26, a detection switch 56 for detecting the connection of the connectors is turned ON, which is detected by the system control circuit 33 to change a recording play-back mode to a play-back mode, so that the play-back mode is indicated on the LCD panel 15. Namely, the play-back indicating portion of the LCD panel 15 flashes.

When the release button 20 is depressed in the play-back mode, the magnetic head 36 reads the signal recorded on a predetermined track of the magnetic disk 37. The signal thus read is outputted to a signal judging circuit 61 and switching circuit 62 of the picture recording and play-back circuit 35. The signal judging circuit 61 judges whether the signal is a picture signal or a sound signal. The judgement can be effected by a data signal recorded together with the sound signal or the picture signal, or by the presense of a vertical synchrounous signal contained in the picture signal.

If the signal judging circuit 61 detects a sound signal, the switching circuit 62 is connected to a sound signal processing circuit 63. On the contrary, if the picture signal is detected by the signal judging circuit 61, the switching circuit 62 is connected to a picture processing circuit 64. By the operation mentioned above, the sound signal and the picture signal are inputted to the sound signal processing circuit 63 and the picture signal processing circuit 64, respectively.

The sound processing circuit 63 demodulates the FM modulated sound signal to supply the same to the sound play-back circuit 54 and sound/picture signal switching circuit 55.

The picture processing circuit 64 demodulate the FM modulated picture signal to send the brightness signal Y+S to the sound/picture signal switching circuit 55 and the color difference signal LSC to the monitor/copy switching circuit 25. Furthermore, the composite signal of the brightness signal and the color difference signal is outputted to the monitor/copy switching circuit 25.

A sound signal extension circuit 65 converts the demodulated sound signal inputted thereto to a digital signal, and successively writes the converted signal into a memory, reads it out, converts it to the analogue signal again and outputs the same. In the course of these processes, the time base of the sound signal is extended. The sound signal is outputted to the monitor/copy changing circuit 25.

The following signal is outputted from the monitor/copy changing switch 25 to the AV output connector 26. If the switch 25 is switched to the monitor side, the sound output signal from the picture recording and play-back circuit 35 and the composite picture signal are outputted to the AV output connector 26. On the other hand, when the switch 25 is moved to the copy side, the demodulated sound signal from the picture recording and play-back circuit 35, and the brightness signal Y+S and the color difference signal LSC (picture signal) are outputted to the AV output connector 26.

As can be seen from the foregoing, according to the present invention, the sound signal and the picture signal can be outputted from the single AV output connector 26. Accordingly, the number of connectors can be reduced, resulting in a realization of a smaller and more compact still video machine. In addition, since only one connecting code is necessary, a good operatibility can be ensured.

Since the monitor signal and the copy signal can be switched by the monitor/copy changing switch 25, when the switch is moved to the copy side, the demodulated signal is outputted, so that the copying can be made by using a signal having a lower distortion and noise level. Upon copying, different sound and picture signals are separately outputted, and accordingly an external device which receives the copying signal can be simplified. For instance, if only the demodulated signal were outputted as the copying signal, it is necessary to provide on the receiver side, a judging circuit which detects whether the signal is the sound singal or the picture signal based on the shape of the reproduced signal, and a separation circuit for separating the brightness signal and the color difference signal. These additional circuits can be simplified or can be dipensed with, if the device is connected to the still video camera of the present invention.

Although in the illustrated embodiment, the monitor/copy changing switch 25 is in the form of a slide switch, a toggle switch or the like can be used in place thereof.

Although the above discussion has been directed to a still video camera, the application of the present invention is not limited thereto. Namely, the present invention can be generally applied to any still video apparatus.

What is claimed is:

1. A still video apparatus comprising means for recording a picture signal onto a recording medium and for playing back the recorded picture signal, single connecting means for connecting said recording and play-back means to an input terminal of an external device, and means for selectively switching a plurality of signals which are issued by said recording and play-back means to an input terminal of said connecting means.

2. A still video apparatus according to claim 1, further comprising means for demodulating said picture signal to produce a brightness signal and a color difference signal, said demodulated signals being composed to produce a composite output signal of said brightness and color difference signals.

3. A still video apparatus according to claim 2, wherein said selective switching means comprises a monitor/dubbing changing switch which selectively sends either said brightness and color difference signals or said composite signal to said input terminal of said external device.

4. A still video apparatus according to claim 2, wherein said recording and play-back means comprises means for recording a sound signal onto said recording medium and for playing back said recorded sound signal.

5. A still video apparatus according to claim 3, wherein said selective switching means operates to output either said brightness and color different signals, said sound signal, or said composite signal from said recording and play-back means.

6. A still video apparatus according to claim 1, wherein said recording medium comprises a magnetic disk, and wherein said recording and play-back means comprises a magnetic head for reading said picture signal and said sound signal recorded onto said magnetic disk.

7. A still video apparatus according to claim 6, wherein said recording and play-back means comprises means for judging whether said signal outputted from said magnetic head is said picture signal or said sound signal, a sound signal processing circuit for demodulating said sound signal, a picture signal processing circuit for demodulating and composing said picture signal, a switching circuit for selectively sending said signal outputted from said magnetic head to either said sound signal processing circuit when said signal judging means detects said sound signal or to said sound signal processing circuit when said signal judging means detects said picture signal, said sound play-back circuit extending a time base of said demodulated sound signal that is outputted by said sound signal processing circuit to produce a sound output signal.

8. A still video apparatus according to claim 3, wherein said connecting means comprises a pair of signal output terminals, and said selective switching means selectively sends either said brightness and color difference signals outputted by said recording and play-back means, said composite output signal and said sound output signal, or said demodulated sound signal to said pair of signal output terminals.

9. A still video apparatus according to claim 8, wherein said selective switching means comprises a monitor/dubbing changing switch which selectively sends either said brightness and color difference signals, said demodulated sound signal, said composite output signal or said sound output signal to said pair of signal output terminals.

10. A still video apparatus according to claim 8, wherein said selective switching means comprises a sound/picture changing switch which selectively sends either said demodulated sound signal or said brightness signal to said monitor/dubbing changing switch.

11. A still video apparatus according to claim 10, wherein said recording and play-back means switches an operation of said sound/picture changing switch in accordance with a signal outputted from a reading means.

12. A still video apparatus, comprising means for reading a picture signal and a sound signal recorded onto a recording medium;

means for playing back and demodulating said picture signal into a brightness signal and a color difference signal, said play-back means composing said brightness and color difference signals to produce a composite signal and demodulating said sound signal and extending a time base thereof so as to produce a demodulated sound signal and a sound output signal, respectively;

single connecting means for transmitting said output signal of said play-back means to an external device; and, means for selectively switching either said brightness and color difference signals outputted by said play-back means, said composite signal, said demodulated sound signal, or said sound output signal to said single connecting means.

13. A still video apparatus according to claim 12, wherein said single connecting means comprises a pair of signal output terminals, and wherein said selective switching means selectively supplies either said brightness and color difference signals, said composite signal, said sound output signal or said demodulated sound signal to said pair of signal output terminals of said single connecting means.

14. A still video apparatus according to claim 13, further comprising a monitor/dubbing changing switch for effecting the switching operation of said output switching means.

15. A still video apparatus according to claim 14, wherein said output switching means comprises a sound/picture changing switch for selectively sending either said demodulated sound signal or said brightness signal to said monitor/dubbing changing switch.

16. A still video apparatus according to claim 15, wherein a switching operation of said sound/picture changing switch takes place in response to said output signals of said reading means.

17. A still video apparatus according to claim 12, wherein said play-back means comprises a sound recording and play-back means for recording said sound signal onto said recording medium and for playing back said recorded sound signal.

18. A still video apparatus according to claim 17, wherein said recording medium comprises a magnetic disk, and said play-back means comprises a magnetic head for reading said picture signal and sound signal recorded onto said magnetic desk.

19. A still video apparatus according to claim 18, wherein said recording and play-back means comprises means for judging whether said signal outputted from said magnetic head is said picture signal or said sound signal, a sound signal processing circuit for demodulating said sound signal, a picture signal processing circuit for demodulating and composing said picture signal, a switching circuit for selectively sending said signal outputted from said magnetic head to either said sound signal processing circuit when said signal judging means detects said sound signal or to said sound signal processing circuit when said signal judging means detects said picture signal, said sound play back circuit extending a time base of said demodulated sound signal that is outputted by said sound signal processing circuit to produce a sound output signal.

20. A still video apparatus, comprising:

means for reading a signal that has been recorded onto a recording medium;

means for demodulating said read signal into a brightness signal and a color difference signal if said read signal is a picture signal;

means for composing said brightness signal and said color difference signals to produce a composite signal;

means for demodulating said signal and extending a time base thereof to produce a sound output signal if said read signal is a sound signal;

means for selectively transmitting either said brightness and color difference signals, said composite signal or said sound output signal to an external device.

21. The apparatus of claim 20, wherein said recording medium comprises a magnetic disc and said reading means comprises a magnetic head.

22. The apparatus of claim 20, wherein said selective transmitting means comprises a monitor/dubbing changing switch.

* * * * *

BEST AVAILABLE COPY

UNITED STATES PATENT AND TRADEMARK OFFICE

CERTIFICATE OF CORRECTION

PATENT NO. : 5,097,344

DATED : March 17, 1992

INVENTOR(S) : H. AOKI et al.

It is certified that error appears in the above-identified patent and that said Letters Patent is hereby corrected as shown below:

On the title page, item: "[illegible] References Cited" insert --SCART ADAPTER, ELEKTOR NO. 9, September [illegible], [illegible]-- under "Other Publications"

Signed and Sealed this

First Day of February, 1994

Attest:

BRUCE LEHMAN

Attesting Officer

*Commissioner of Patents and Trademarks*